US010345428B1

(12) United States Patent
Oden

(10) Patent No.: US 10,345,428 B1
(45) Date of Patent: Jul. 9, 2019

(54) ANGLE-BASED MULTIPLE-SOURCE GEOLOCATION METHOD AND GEOLOCATION GEOMETRY EVALUATION BASED ON COVARIANCE MATRIX

(71) Applicant: BAE SYSTEMS Information and Electronic Systems Integration Inc., Nashua, NH (US)

(72) Inventor: Mark W. Oden, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/004,001

(22) Filed: Jun. 8, 2018

(51) Int. Cl.
G01S 1/24 (2006.01)
G01S 5/04 (2006.01)
G01S 5/02 (2010.01)

(52) U.S. Cl.
CPC ............. G01S 5/04 (2013.01); G01S 5/0221 (2013.01)

(58) Field of Classification Search
CPC ................................. G01S 5/04; G01S 5/0221
USPC ......... 455/456.1, 456.2, 41.1, 41.2; 342/453, 342/457, 463, 464, 387, 442, 443, 444
See application file for complete search history.

(56) References Cited

U.S. PATENT DOCUMENTS

| | | | |
|---|---|---|---|
| 6,933,888 B1 | 8/2005 | Schiffmiller et al. | |
| 8,380,220 B2* | 2/2013 | Alles | G01S 5/021 455/456.1 |
| 9,173,060 B2* | 10/2015 | Alles | G01S 5/021 |
| 2002/0050988 A1* | 5/2002 | Petrov | G06K 9/20 345/418 |
| 2002/0196188 A1* | 12/2002 | Holt | G01S 3/02 342/453 |
| 2007/0037518 A1* | 2/2007 | Ninomiya | G01S 3/46 455/41.2 |
| 2010/0201576 A1* | 8/2010 | Fujimoto | G01S 5/08 342/464 |
| 2011/0001658 A1* | 1/2011 | Noble | G01S 5/04 342/107 |
| 2013/0217412 A1* | 8/2013 | Segall | H04W 64/00 455/456.1 |
| 2015/0339823 A1* | 11/2015 | Siomina | G01S 19/48 348/135 |

\* cited by examiner

*Primary Examiner* — Congvan Tran
(74) *Attorney, Agent, or Firm* — Finch & Maloney PLLC; Scott J. Asmus

(57) ABSTRACT

A computer-implemented method of geolocating a target includes: receiving, from a plurality of sources, a corresponding plurality of angle estimates of the target relative to the respective sources; generating a corresponding plurality of planar renditions of the received angle estimates; selecting a combination of two or more planar renditions whose intersection defines a polygon; in response to multiple such combinations, selecting one having a largest number of planar renditions; and determining a center of the polygon of the selected combination. A computer-implemented method of evaluating geolocation geometry with respect to a target includes: geolocating the target from received sensor data of the target from multiple sources and location data of the sources; generating entries of a covariance matrix from the location data and the geolocation; deriving eigenvalues of the covariance matrix from the generated entries; and comparing the derived eigenvalues to evaluate the geolocation geometry with respect to the target.

16 Claims, 8 Drawing Sheets

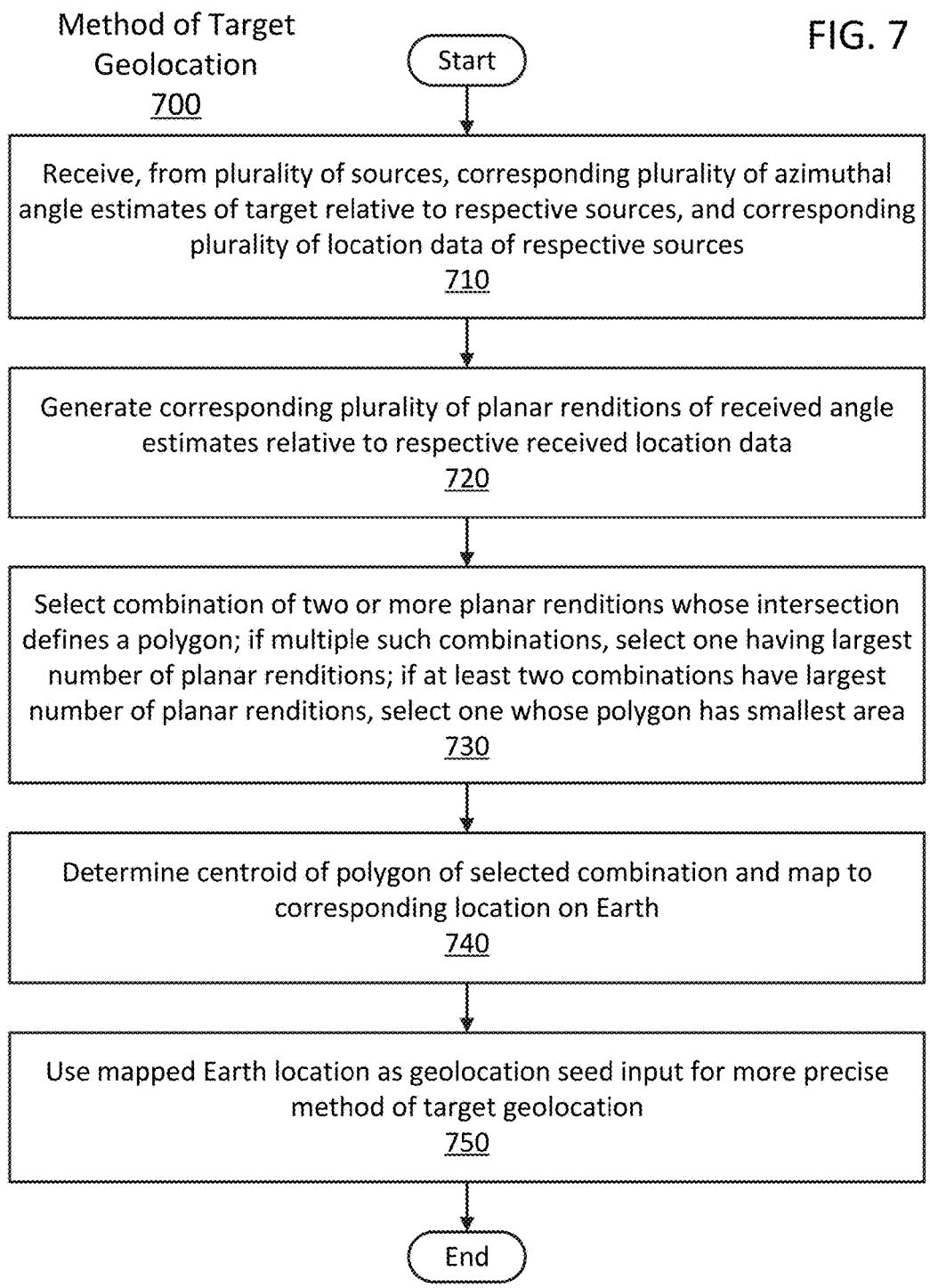

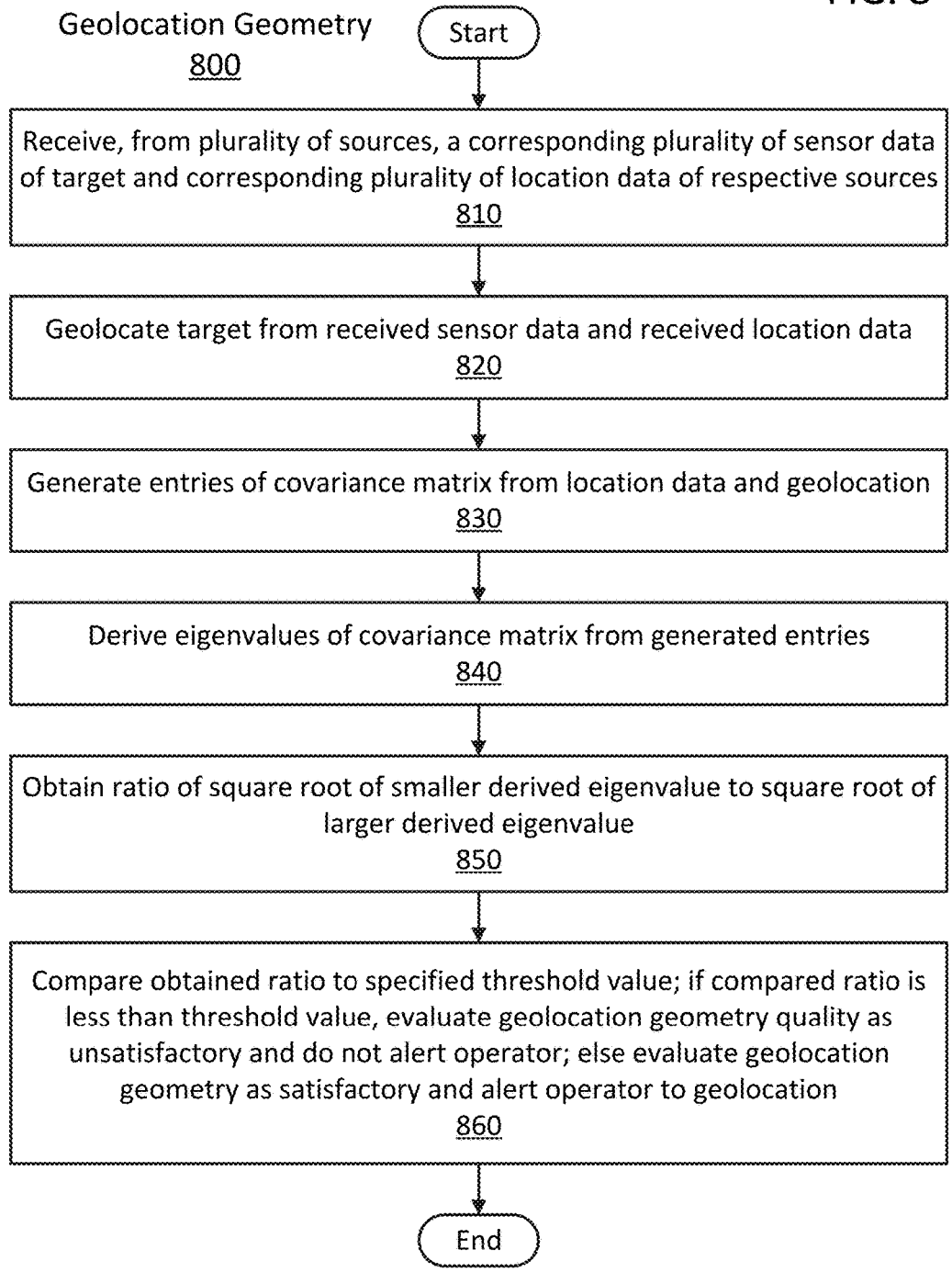

ANGLE-BASED MULTIPLE-SOURCE GEOLOCATION METHOD AND GEOLOCATION GEOMETRY EVALUATION BASED ON COVARIANCE MATRIX

STATEMENT REGARDING FEDERALLY SPONSORED RESEARCH OR DEVELOPMENT

This invention was made with government support under contract F33657-02-D-0009 awarded by the U.S. Air Force. The government has certain rights in the invention.

FIELD OF THE DISCLOSURE

This disclosure relates to geolocation, such as angle-based multiple-source geolocation methods and geolocation geometry evaluation based on covariance matrices.

BACKGROUND

Geolocation refers to the process of determining or estimating the location (on Earth) of an object (or target), such as from sensor measurements. Some geolocation techniques require a seed location of the target to perform the geolocation. The seed location primes the geolocation technique so that the Earth location of the target can be determined by refining the seed location. In addition, some geolocation techniques require multiple sources of sensor data from corresponding multiple locations to geolocate the target. The multiple locations define a geolocation geometry. However, there are a number of nontrivial issues associated with such geolocation techniques, including the quality of the geolocation seed location and the quality of the geolocation geometry with respect to the target and the accuracy of the determined Earth location of the target.

BRIEF DESCRIPTION OF THE DRAWINGS

Features of embodiments of the claimed subject matter will become apparent as the following Detailed Description proceeds, and upon reference to the Drawings, wherein like numerals depict like parts.

FIG. 7 is a flow diagram of an example method of geolocation of a target, according to an embodiment of the present disclosure.

FIG. 8 is a flow diagram of an example method of evaluating a geolocation geometry, according to an embodiment of the present disclosure.

Figure 1:
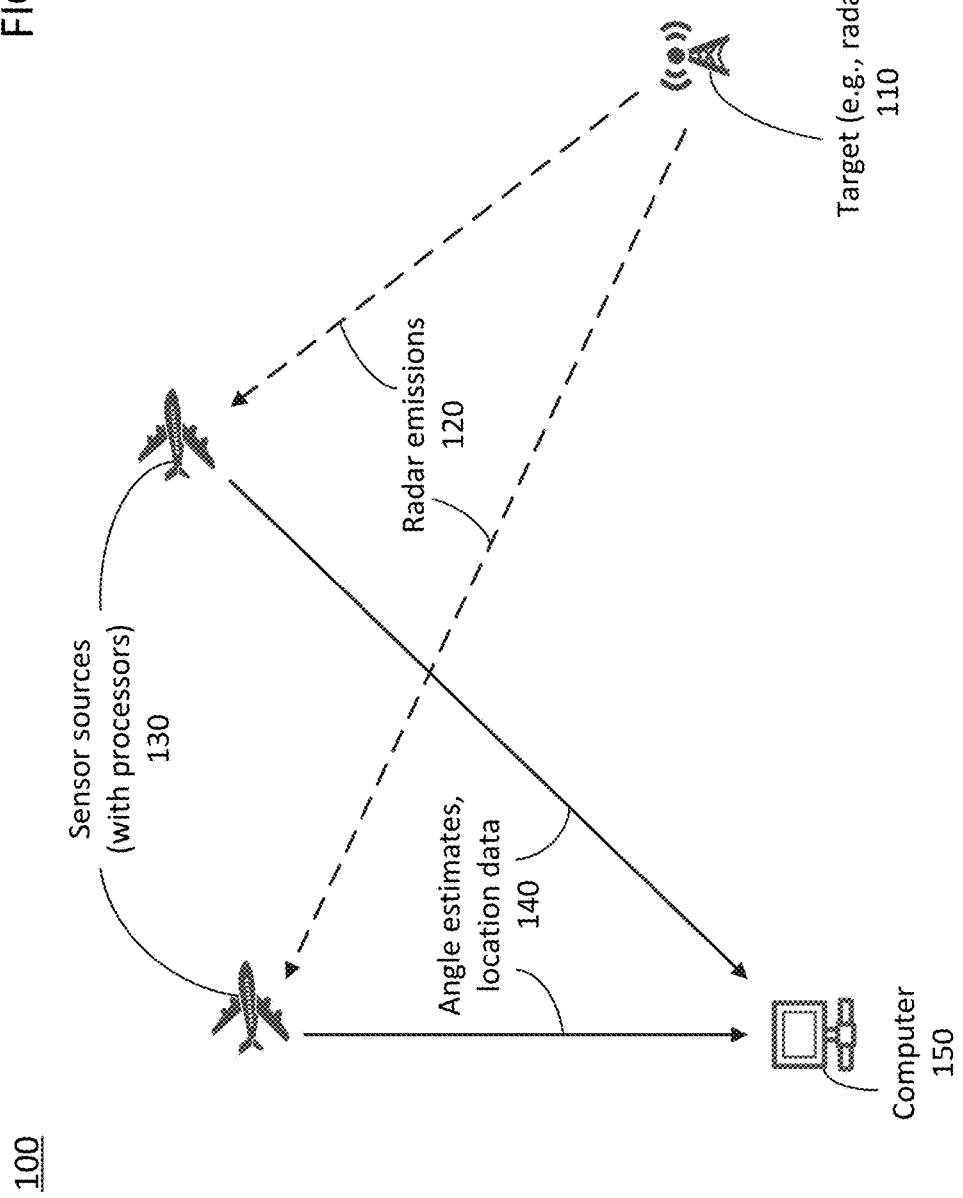
FIG. 1 is a schematic diagram of an example use case of a system for geolocating a target, and for evaluating the geolocation geometry with respect to a target, according to an embodiment of the present disclosure.

Although the following Detailed Description will proceed with reference being made to illustrative embodiments, many alternatives, modifications, and variations thereof will be apparent to those in light of the present disclosure.

DETAILED DESCRIPTION

According to one or more embodiments of the present disclosure, a method of geolocating a target is provided. The method can be carried out, for example, by a computer processor-based system. The method includes receiving sensor data of the target in the form of angle estimates from multiple geographically-separated sensors. For example, each sensor can be on a different aircraft, where the aircraft are sensing radar emissions from the target (such as a radar transmitter). Each angle estimate can be relative to its respective aircraft. In addition, each angle estimate can represent a confidence region, such as an azimuthal or conical angle emanating from the aircraft and having a high likelihood of containing the target. The method further includes generating planar (such as two-dimensional or 2D) representations or renditions of these angle estimates. The planar renditions can simplify the 3D environment being sensed to a 2D (e.g., flat) representation. The method further includes selecting a combination of two or more of these planar renditions whose intersection is (e.g., defines) a polygon.

Such a polygon is a bounded region for which the confidence regions of a corresponding two or more of the aircraft overlap. For example, there is a large likelihood of finding the target in the region represented by the polygon. In addition, in case there are multiple combinations of the planar renditions whose intersection is a polygon, the method further includes selecting one such combinations having a largest number of the planar renditions. Such a polygon is part of the confidence region of the largest number of the aircraft whose planar angle estimates intersect in a polygon. For example, there is the largest likelihood of finding the target in the region represented by this polygon. If there are more than one such combinations having the largest number of planar renditions, the method further includes selecting the combination whose polygonal intersection area is smallest. The method further includes finding a center of the selected polygon (such as the centroid, or center of mass, of the polygon), and mapping this center to a corresponding location on the Earth. In some embodiments, this mapped Earth location is used as a geolocation seed input for a more precise method of geolocating the target.

According to one or more embodiments of the present disclosure, a method of evaluating geolocation geometry with respect to a target is provided. The method can be carried out, for example, by a computer processor-based system. The geolocation is obtained from multiple sensors (sources) at different locations. The locations form a geometry with respect to the target's location (e.g., as determined by the geolocation). Evaluating the geometry with respect to the target's location can give insight into the geolocation, since a poor geometry can lead to a poor geolocation (e.g., one that cannot be trusted). The method includes receiving, from the multiple sources, corresponding sensor data of the target and corresponding location data of the respective sources. For example, when the sources are moving aircraft, their corresponding locations change over time. The method further includes geolocating the target from the received sensor data and the received location data (e.g., to estimate the target's location on Earth).

The location data and the target's location form a set of points in 3D space (e.g., as defined by north-south, east-west, and up-down axes, or X, Y, and Z axes, respectively). As such, the planar (e.g., X and Y axes) covariance data can be determined, setting aside the vertical (e.g., Z axis) component to generate a 2×2 covariance matrix. From this covariance matrix, the two eigenvalues can be derived (e.g., calculated) and then compared. The square roots of these eigenvalues define the semi-minor (smaller) and semi-major (larger) axes of a confidence ellipse that describes the distribution of the sources and the target in the 2D space. The method includes forming a ratio (e.g., dividing) of the smaller square root to the larger square root, and comparing this ratio to a specified threshold value, such as 0.25. The threshold value can be application-specific, depending on factors such as intended use of the evaluation. If the ratio is smaller than the threshold, the geolocation geometry is evaluated to be unsatisfactory, and is not reported. Otherwise, the geolocation geometry is evaluated to be satisfactory, and is reported (e.g., to an operator of the system). In some embodiments, a poor geolocation geometry can cause the system to notify one or more of the sources to relocate (e.g., to obtain a better ratio).

GENERAL OVERVIEW

As mentioned above, there are a number of non-trivial issues associated with geolocation techniques. For example, some techniques refine a geolocation seed of the target's location that is provided as input to the geolocation technique. However, an inaccurate geolocation seed can lead to an incorrect geolocation (e.g., the geolocation technique may not be able to recover the target's location from starting with the inaccurate seed location). Furthermore, generating an accurate geolocation seed can be resource- and time-intensive, to the point of being as much effort or more to determine as the target's location from the seed location, and can still sometimes lead to inaccurate seed locations. In addition, as mentioned above, there are a number of non-trivial issues associated with the quality of the geolocation geometry with respect to the target and the accuracy of the determined Earth location of the target. For example, when the sensor sources (such as aircraft) and the target are in roughly a collinear orientation when viewed from above, the determined Earth location can often be too inaccurate for the intended purpose of the geolocation (e.g., determining a precise location of the target). Furthermore, expecting operators of the sensor data or platforms (e.g., pilots) to ascertain the geometry and make appropriate corrections can be problematic. For example, it can be difficult to determine in real time if the geometry is bad or what steps to do in a coordinated fashion (e.g., among all the operators) to remedy the unsatisfactory geometry.

Thus, in accordance with one or more embodiments of the present disclosure, geolocation techniques are provided for multiple-source geolocation environments. These include techniques for angle-based location estimation (e.g., geolocation seed determination) and geolocation geometry evaluation with respect to the target. In a multiple-source environment, several geographically-separated sensor sources (e.g., radar detectors), are sensing a target (e.g., a radar source or transmitter). The sensor sources, for example, may be on separate platforms (e.g., aircraft). In some embodiments, two or more sources are on the same moving platform, but their sensings of the target are at different times to produce different corresponding source locations.

In one or more embodiments, a geolocation technique is provided, such as a technique for determining a geolocation seed of a target. The sensor sources produce angle data, such as angle of arrival (AoA) data, as estimates of the target's location. The AoA data can be produced, for example, using time difference of arrival (TDOA) data, such as from different antenna elements of the same radar sensor. With AoA data, the source has an approximate bearing of the target (such as a radar source), together with an estimated confidence region (e.g., azimuthal or conical angle) about the line of bearing. Higher confidence estimates have smaller angles. The angle data is with respect to the source's location. In some embodiments, the sources are moving platforms, and their locations are supplied to a geolocation system (such as on the ground or one of the sources) in addition to the angle estimates. The geolocation system takes the various angle data (and possibly location data) from the different sources and generates planar renditions of the angle data. In some embodiments, the planar renditions are plan views (e.g., 2D space, such as longitude-latitude or X-Y) of the angle estimates, where elevation of the sources and target are not considered, and the angles are depicted as azimuthal angles emanating from the respective sources.

Depending on the angle estimates, and their corresponding planar renditions, various intersection possibilities can take place. Ideally, all the angle estimates (or the planar renditions) intersect in a common polygon, which would define the largest region common to all estimates. However, angle estimates may not all correlate to the same target location, so in one or more embodiments, a combination of planar renditions is selected having the largest number of angle estimates that share an intersection polygon. In some such embodiments, when there are multiple combinations of the largest number of planar renditions having an intersection polygon, the combination having the smallest intersection polygon is selected. A center of the selected polygon (for example, the centroid of the polygon), is used as the estimated location of the target (or geolocation seed). In some embodiments, the center of the selected polygon is mapped to a corresponding location on the Earth, such as with a database of ground elevation data. In some embodiments, this mapped Earth location becomes a seed location for a (more precise) geolocation technique.

In one or more embodiments, a geolocation system (including one or more computer processors) receives the platform position, angle of arrival estimate, and corresponding accuracy from each of several platforms sensing the target. The platform positions and angle estimates are combined in a 2D plane to generate a region of interest for each platform. The regions of interest are successively intersected to determine the smallest region of interest common to as many of the platforms as possible. It should be noted that the more regions of interest used to define the intersection, the smaller the common region of interest becomes. It should also be noted that angle estimates having higher confidence generate smaller angles, which lead to smaller corresponding intersection polygons. Accordingly, when there are multiple regions of interest common to as many of the platforms as possible, the smallest such region of interest is selected. The center of the selected region is used as the latitude/longitude estimate of the target, and the elevation is determined by ground elevation data.

In some embodiments, wild bearing (e.g., an inaccurate angle estimate) from one (or more) of the platforms is prevented (or substantially reduced) from determining the geolocation seed since the particular region or regions of interest from such inaccurate angle estimates are unlikely to overlap many of the other (more accurate) regions of interest. Furthermore, even when such inaccurate angle estimates overlap as many of the other angle estimates, they will likely do so in a larger overlapped region since the accurate angle estimates having narrow angles will likely intersect in a small area. By contrast, incorporating a wider (less accurate) angle estimate in place of one of the narrow (more accurate) angle estimates will likely result in a larger area of intersection (assuming the largest number of intersecting angles is still achieved). Accordingly, such wild estimates are eliminated (or their effects greatly reduced) by the selection process of choosing the intersection polygon from the largest combinations of the regions of interest, and from among multiple such largest combinations, choosing the combination having the smallest common region of interest.

In addition, in or more other embodiments of the present disclosure, a geolocation geometry evaluation technique is provided. The locations of the multiple sensor platforms, together with the estimated location of the target from the geolocation, form a geometry in 3D space. This can be reduced to a 2D (planar) representation by considering only the planar (e.g., latitude/longitude or X-Y) dimensions. The different locations can be incorporated into a 2×2 covariance matrix of the different dimensions (e.g., X and Y dimensions). The (two) eigenvalues of this covariance matrix can be used to define a confidence ellipse that describes the geometry of the geolocation with respect to the target. In some embodiments, the square roots of these eigenvalues (which define the semi-minor and semi-major axes of the confidence ellipse) are compared to evaluate the geolocation geometry.

In one or more such embodiments, a ratio of the semi-minor axis to the semi-major axis is calculated. The ratio can be compared to a specified threshold value. For example, a long and thin geometry, where the X and Y data are highly correlated, produces a corresponding long and thin confidence ellipse having a small ratio of the semi-minor to semi-major axes. Setting a threshold value to some value like 0.25, and throwing out geolocations whose ratio is less than this threshold value would exclude such geometries from being considered satisfactory. By contrast, a more randomly dispersed geometry, where the X and Y data are not very correlated, produces a more circular confidence ellipse having a ratio closer to 1. As such, keeping geometries whose ratios exceed the threshold value (e.g., satisfactory geometries) allows only those geolocations whose underlying geometries are likely to produce accurate estimates of the target location to be kept or considered (or acted upon).

In one or more embodiments, a geolocation geometry evaluation system (including one or more computer processors) converts the covariance matrix associated with the geolocation into a 2D ellipse (such as a confidence ellipse defined by the square roots of the eigenvalues of the covariance matrix). In some such embodiments, the ratio of the semi-minor axis to the semi-major axis is used as a measure of geometry quality. Ratios falling under a specified threshold can be suppressed rather than, for example, passed to the next higher level (such as an operator of the system). As such, poor geometry geolocation solutions can be excluded. The ratio threshold can be determined, for example, by analysis of flight test data and/or lab data. The threshold can be application specific, such as a higher threshold when target accuracy is important (e.g., to engage the target). In some embodiments, the system attempts to correct the poor geometry by notifying one or more of the platforms to reposition themselves with respect to the target and the other platforms (e.g., to produce a better shaped confidence ellipse having a higher ratio).

Numerous other example embodiments and configurations will be apparent in light of this disclosure.

System Architecture

FIG. 1 is a schematic diagram of an example use case 100 of a system for geolocating a target, and for evaluating the geolocation geometry with respect to a target, according to an embodiment of the present disclosure.

In FIG. 1, there are a number of moving sensor platforms (or sources) 130 each observing or sensing a target 110 (for example, a stationary or relatively stationary target such as a ground-based radar system). The target 110 emits electromagnetic radiation, for example as radar emissions 120, that is observed by the sensor sources 130. The sources 130, for example, produce angle estimates of the target 110 from the respective sources 130 based on the observed radar emissions 120 (e.g., using TDOA techniques from multiple antenna elements in the same sensor to determine the target's direction relative to the sensor source 130). The sensor sources 130 also keep track of their respective locations (e.g., through inertial navigation systems, global positioning systems like GPS, to name a few), such as when the sources 130 are moving platforms (e.g., aircraft). The system includes a computer 150 having one or more processing elements or processors that receive the angle estimates and location as transmissions 140 (e.g., radio or other communication transmissions) from the sensors 130. In some embodiments, the computer 150 is part of one of the sensor sources 130 (e.g., on board one of the platforms). The computer 150 performs the geolocation of the target 110 using the received angle estimates and location data 140.

In one or more embodiments, the computer 150 evaluates a geolocation geometry. For example, the different sensor sources 130 together with the location of the (geolocated) target 110 form a geolocation geometry with respect to the target 110. The computer 150 can evaluate this geometry to uncover if it is a bad geometry, e.g., having a high likelihood of producing an inaccurate geolocation, before such geolocations are passed to an operator (e.g., an operator charged with acting on the geolocated targets 110). In some embodiments, the computer 150 evaluates the geolocation geometry by using a covariance matrix (e.g., of the different location data of the sources 130 and the geolocation of the target 110). These and other concepts will be described in further detail with reference to FIGS. 2-6.

The computer 150 and other electronic components and techniques described herein can be implemented as (or on) an electronic processing component, such as a signal processor, a field programmable gate array (FPGA), a microprocessor, or the like. For example, the computer 150 and other components or methods can be implemented in hardware or software, or some combination of the two. For instance, the computer 150 can be implemented as a microprocessor with instructions encoded therein that, when executed, cause the microprocessor to carry out the tasks of the computer 150. In another embodiment, the computer 150 may be implemented as a custom circuit such as a field programmable gate array (FPGA) configured to carry out these tasks. In a further example, there are one or more memory units (such as non-volatile memory units) that is or are coupled to the processing component.

For example, the computer 150 and other circuits disclosed herein may be custom hardware circuits or general-purpose computer hardware configured (e.g., through software, firmware, customized logic, to name a few) to carry out the tasks assigned to the circuit. While circuits are illustrated as being made up of other circuits by function, in other embodiments, two or more circuits may be combined into a single circuit performing the functionality of the two or more circuits. In still other embodiments, a single circuit can be divided into two or more circuits, each performing separate functions performed by the single circuit. As will be further appreciated, a circuit as used herein is a physical structure capable of carrying out one or more functionalities as variously provided herein, whether the structure be hardware only such as purpose-built semiconductor (e.g., gate-level logic or application specific integrated circuit) or a printed circuit board populated with discrete components configured and arranged to carry out the various functionalities provided herein, or a processor-based system programmed with computer code or instructions that are executable by the processor-based system to carry out the various functionalities provided herein, or a combination of such hardware and software based architectures (e.g., printed circuit board with one or more embedded routines executable by one or more processors). Numerous such embodiments and configurations will be appreciated in light of this disclosure.

Figure 2:
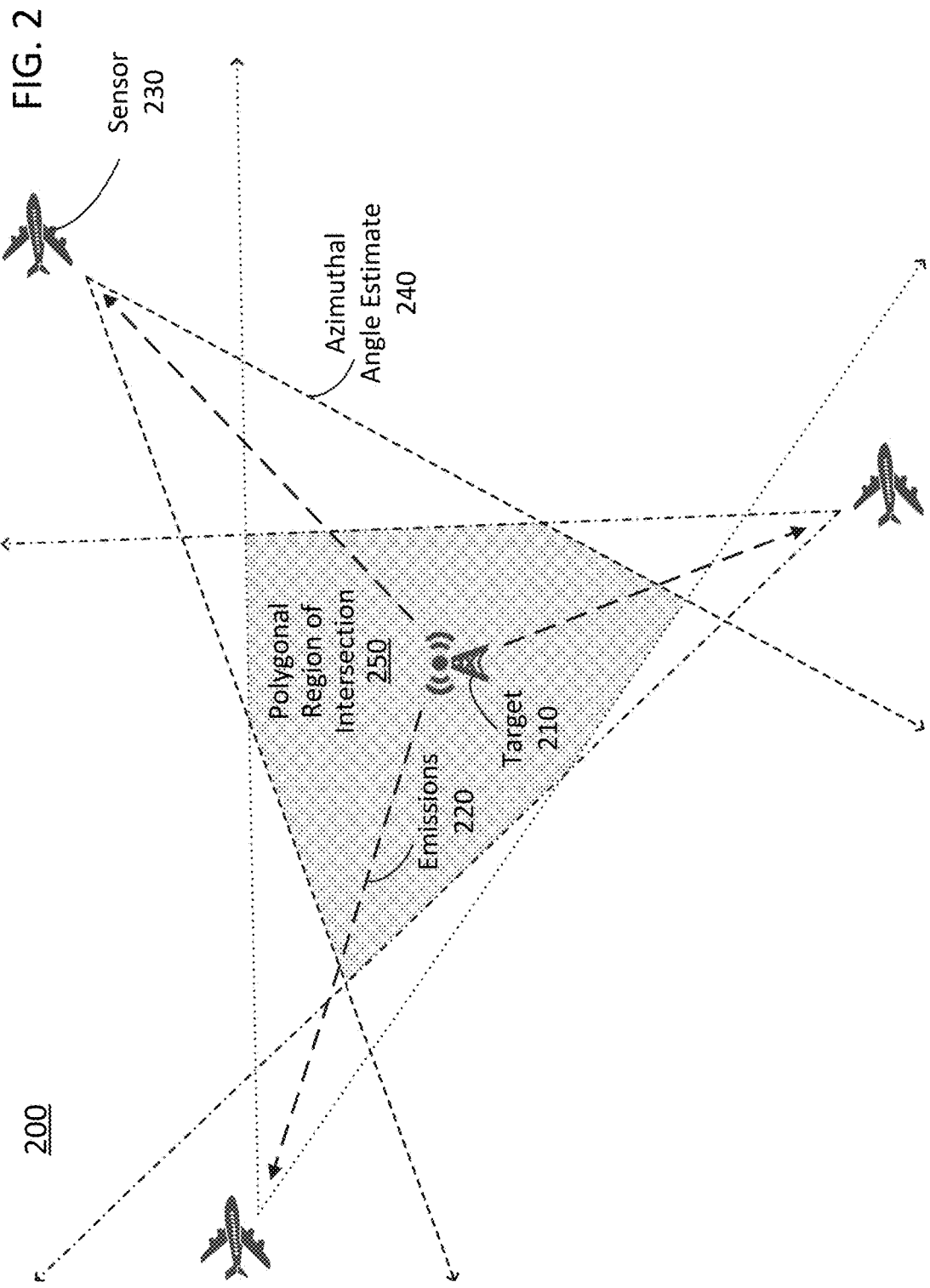
FIG. 2 is a plan view of an example polygonal region of intersection of several azimuthal angle estimates of a target in an angle-based multiple-source method of geolocation, according to an embodiment of the present disclosure.

FIG. 2 is a plan view 200 of an example polygonal region of intersection 250 of several azimuthal angle estimates 240 of a target 210 in an angle-based multiple-source method of geolocation, according to an embodiment of the present disclosure. The method may be carried out, for example, by the computer 150 of FIG. 1. For ease of description, in most of the described embodiments, the sensing platforms are moving with respect to the target (such as airborne sensors observing a fixed target). However, the present disclosure is not limited to such environments. In other embodiments, the sensing platforms are stationary, and the target is moving, or all or only some of the sensing platforms and target are stationary. In some embodiments, one or more sensing platforms move over time to collect sensing data of the target from multiple locations. For example, when the target is stationary, or moving in a predictable fashion, the timing of the different acquired sensor data (sources) is not necessarily concurrent. In some embodiments, there is only one sensing platform, that moves relative to the target over time to obtain the differently sourced sensor data.

In addition, for ease of description, most of the described embodiments refer to the target as a radar transmitter, and the sensing platforms as radar detectors. However, the present disclosure is not limited to such. For example, in other embodiments, the target is emitting (such as generating or reflecting) other forms of electromagnetic radiation (e.g., communication signals, light, or the like) that are being sensed by the sensing platforms.

In FIG. 2, there are three sensors 230 (e.g., airborne sensors observing the target 210, such as a radar transmitter). The sensors 230 observe the emissions 220 (e.g., radar emissions) emanating from the target 210 and produce corresponding azimuthal angle estimates 240 (e.g., planar angles without an elevation or vertical component). For ease of description and illustration, the angle estimates 240 are azimuthal or planar, but the present disclosure is not so limited. For example, in some embodiments, the sensors 230 produce conical (e.g., 3D) angle estimates. Accordingly, the term "azimuthal angle estimate" is used throughout to denote both azimuthal angles and the azimuthal components of other types of angle estimates (e.g., conical angle estimates). The angle estimates can be produced, for example, using TDOA processing with multiple antenna elements that are part of the same sensor 230.

For reasons such as ease of computation and practicality of estimation, the angle estimates 240 are converted to planar renditions that share the same plane, and that emanate from their corresponding sensors 230. For example, 2D renditions (e.g., latitude/longitude or X-Y axes) of the estimates are used throughout. In some embodiments, the output of the geolocation technique is used as a geolocation seed input to a more precise technique of geolocation. As such, speed of estimating the location of the target may be more important than absolute precision in the estimated location.

The angle estimates 240 can represent, for example, an estimated line of bearing to the target 210 from the respective sensors 230 along with some variance (e.g., 90% confidence interval variance) to account for expected error in the line of bearing estimates. The polygon 250 that defines the region of intersection of the three angle estimates 240 represents the region common to all the estimates. While the target 210 is illustrated close to the center of each angle estimate 240, this is for ease of illustration only. Any point in the polygon 250 is part of, for example, the 90% confidence region of each of the angle estimates 240 from the respective sensors 230. Furthermore, while later stages of the geolocation technique can use the center (e.g., the centroid) of the polygon 250 as the geolocation (or geolocation seed), this is in part because such a point has the least average distance to any other point in the polygon 250. As such, the center or centroid of the polygon 250 represents a good estimate of any point in the polygon 250, at least for purposes such as serving as a geolocation seed for a more precise method of geolocation.

Figure 3:
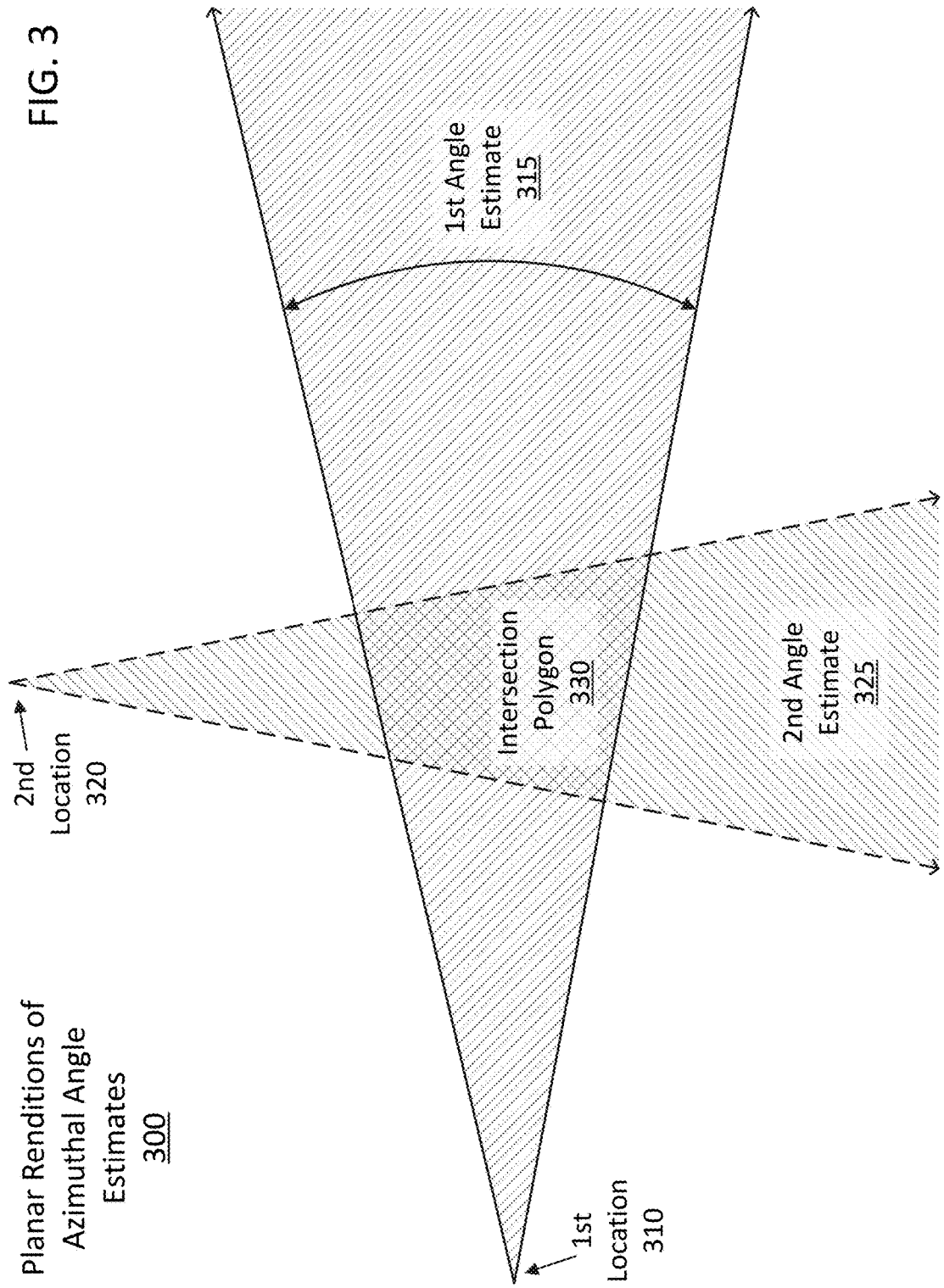
FIG. 3 is a plan view of example planar renditions of azimuthal angle estimates forming an intersection polygon in an angle-based multiple-source method of geolocation, according to an embodiment of the present disclosure.

FIG. 3 is a plan view of example planar renditions 300 of two azimuthal angle estimates (including first angle estimate 315 and second angle estimate 325) forming an intersection polygon 330 in an angle-based multiple-source method of geolocation, according to an embodiment of the present disclosure. The first and second angle estimates 315 and 325 emanate from first and second locations 310 and 320, respectively. The intersection polygon 330 is a quadrilateral representing the region common to both angle estimates. As such, there is a high likelihood that the target is in the region corresponding to the intersection polygon 330.

Figure 4:
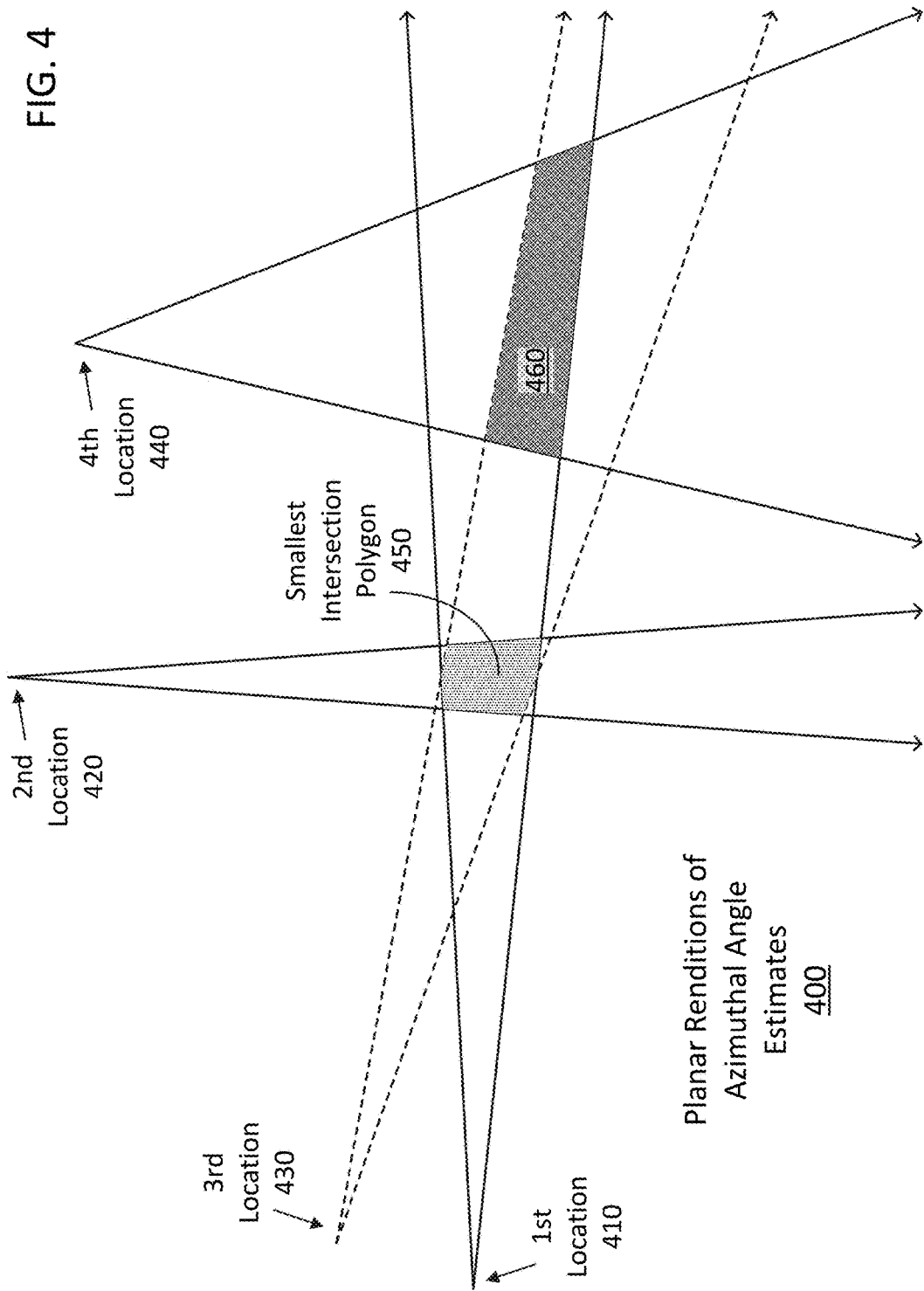
FIG. 4 is a plan view of example planar renditions of azimuthal angle estimates forming multiple intersection polygons in an angle-based multiple-source method of geolocation, according to an embodiment of the present disclosure.

FIG. 4 is a plan view of example planar renditions 400 of azimuthal angle estimates forming multiple intersection polygons (including shaded portions corresponding to the most number (three) of intersecting angle estimates) in an angle-based multiple-source method of geolocation, according to an embodiment of the present disclosure. The first, second, third, and fourth angle estimates emanate from first, second, third, and fourth locations 410, 420, 430, and 440, respectively, with the third angle estimate (from the third location 430) being dashed to better distinguish it from the first angle estimate (from the first location 410). The first, second, and third angle estimates are accurate (e.g., narrow) angle estimates intersecting in the smallest intersection polygon 450. The fourth angle estimate (from the fourth location 440) is a less accurate (e.g., wider) angle estimate that forms a larger (and darker) shaded intersection polygon 460 with the first and third angle estimates. In such a scenario, the smallest intersection polygon 450 is selected as the polygon most likely to include the location of the target, while the largest intersection polygon 460 is discarded as coming from a bad angle estimate (namely, the fourth angle estimate). This is because the more accurate the angle estimates are, the smaller their corresponding angles and the greater the likelihood that they will intersect in a location corresponding to the target and that they will intersect in a small polygon. By contrast, an inaccurate angle estimate (e.g., large angle and not directed to the target) will not likely intersect with as many of the other angle estimates, and even if it does, is unlikely to intersect in as small of a polygon.

Once the smallest intersection polygon 450 is selected, the target's location is estimated by finding a center (such as the centroid, or center of mass) of the polygon 450. In some embodiments, a different center point is chosen (such as the center of the smallest rectangle that encloses the polygon 450 in both dimensions, or a center defined by the intersection of diagonals from opposite vertices of the polygon 450, to name a few). Once the center is determined, it can be mapped or otherwise converted to a corresponding location on the Earth (e.g., through a database ground elevation data) to serve as the target's estimated location on the Earth. This estimated location can be used as a geolocation seed to a more precise method of geolocation, such as those described in U.S. Pat. No. 6,933,888, which is herein incorporated by reference in its entirety.

Figure 5:
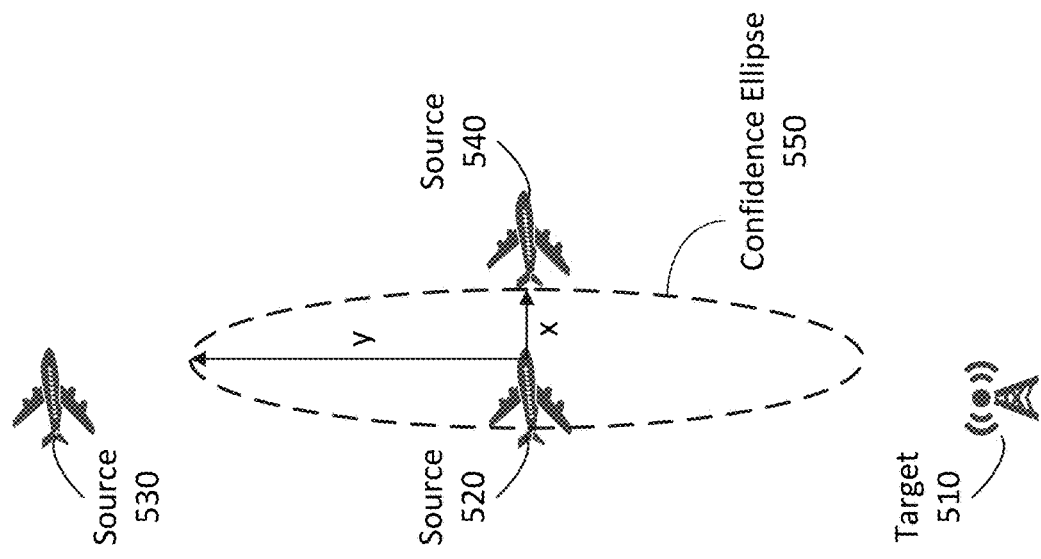
FIG. 5 is a plan view of an example unsatisfactory geolocation geometry as determined by a geolocation geometry evaluation method based on a covariance matrix, according to an embodiment of the present disclosure.

FIG. 5 is a plan view of an example unsatisfactory geolocation geometry 500 as determined by a geolocation geometry evaluation method based on a covariance matrix, according to an embodiment of the present disclosure. In the geometry 500 of FIG. 5, the geolocation for a target 510 is performed using the sensor and location data from three sources 520, 530, and 540. As can be seen, the target 510, source 520, source 520, and source 530 are arranged linearly in the planar (2D) depiction of the geometry, while source 540 is only a small distance from this line. As such, the geolocation geometry is closer to linear (e.g., correlated) with respect to the target 510 than randomly dispersed (e.g., uncorrelated), so the geometry may be unsatisfactory for performing a good geolocation.

To evaluate the geolocation geometry, the planar (e.g., latitude and longitude, or X-Y axes, or the like) location data of the three sources 520, 530, and 540 along with the (geolocated) location of the target 510 are considered. The location data corresponds to a confidence ellipse, such as confidence ellipse 550. The size of the confidence ellipse varies with the level of confidence desired (higher confidence levels result in correspondingly larger confidence ellipses), but the shape, orientation, and center of the confidence ellipses do not vary for the same set of location data. For purposes of evaluating the geolocation geometry, in one or more embodiments, the ratio of the semi-minor axis (labeled x in FIG. 5) to the semi-major axis (labeled y) is considered. This ratio does not depend on the size of the confidence ellipse (confidence level), only its shape.

To calculate the desired ratio x/y, the covariance matrix of the planar covariances of the location data of the sources 520, 530, and 540 along with the (geolocated) location of the target 510 is generated. For example, the variance in each of the X and Y directions, along with the covariance in the X direction with respect to the Y direction (and the covariance of the Y direction with respect to the X direction, but that is the same value as the other covariance) can be determined. These are the four entries in the 2×2 (planar) covariance matrix. The two eigenvalues for this covariance matrix can then be determined, as can their corresponding square roots. The smaller square root corresponds to the length x of the semi-minor axis of the confidence ellipse, while the larger square root corresponds to the length y of the semi-major axis. Accordingly, the ratio x/y can be obtained by dividing these two square roots.

The ratio x/y is a measure of the correlation of the geolocation geometry with respect to the target 510, with a ratio of 0 corresponding to completely correlated (unsatisfactory geometry), a ratio of 1 corresponding to completely uncorrelated (satisfactory geometry), and ratios between 0 and 1 corresponding to the degree of correlation. In one or more embodiments, a threshold value (such as a predetermined or specified threshold value) between 0 and 1 is used to mark the boundary between an unsatisfactory geolocation geometry (e.g., less than the threshold value, or less than or equal to the threshold value) and a satisfactory geolocation geometry (e.g., greater than the threshold value, or greater than or equal to the threshold value). For example (and as used throughout for purposes of illustration), the threshold value can be set to 0.25. In FIG. 5, the ratio x/y has a value of 0.2 (e.g., a long a thin confidence ellipse 550). Since 0.2<0.25, the geometry is evaluated to be unsatisfactory.

However, suitable values for this threshold are application specific and can be determined, for example, empirically, as would be apparent in light of this disclosure. For example, in some embodiments, a higher threshold value, such as 0.33 or 0.5 is used, to enforce less correlation in the location data for satisfactory geolocation geometries. For instance, in some applications, accuracy of the geolocation is crucial (e.g., such as for deciding whether to engage the target). Accordingly, higher threshold values can be used to reduce or prevent the possibility of a poor geolocation geometry from compromising the accuracy of the determined location of the target.

For ease of description, it should be noted that while the threshold values and the comparison is described for a ratio of the smaller square root eigenvalue to the larger square root eigenvalue, the disclosure is not limited to this approach. There are a number of mathematically equivalent versions of this comparison and corresponding threshold values covered by this disclosure. For example, this ratio comparison is equivalent to dividing the larger of the two square roots by the smaller, and evaluating the geolocation geometry as unsatisfactory if this ratio is greater than the reciprocal of the (above described) threshold value, or to dividing the smaller eigenvalue by the larger eigenvalue and evaluating the geolocation as unsatisfactory if this ratio is less than the square of the threshold value. Accordingly, in some embodiments, mathematically equivalent versions of the ratio and corresponding threshold values are provided.

Figure 6:
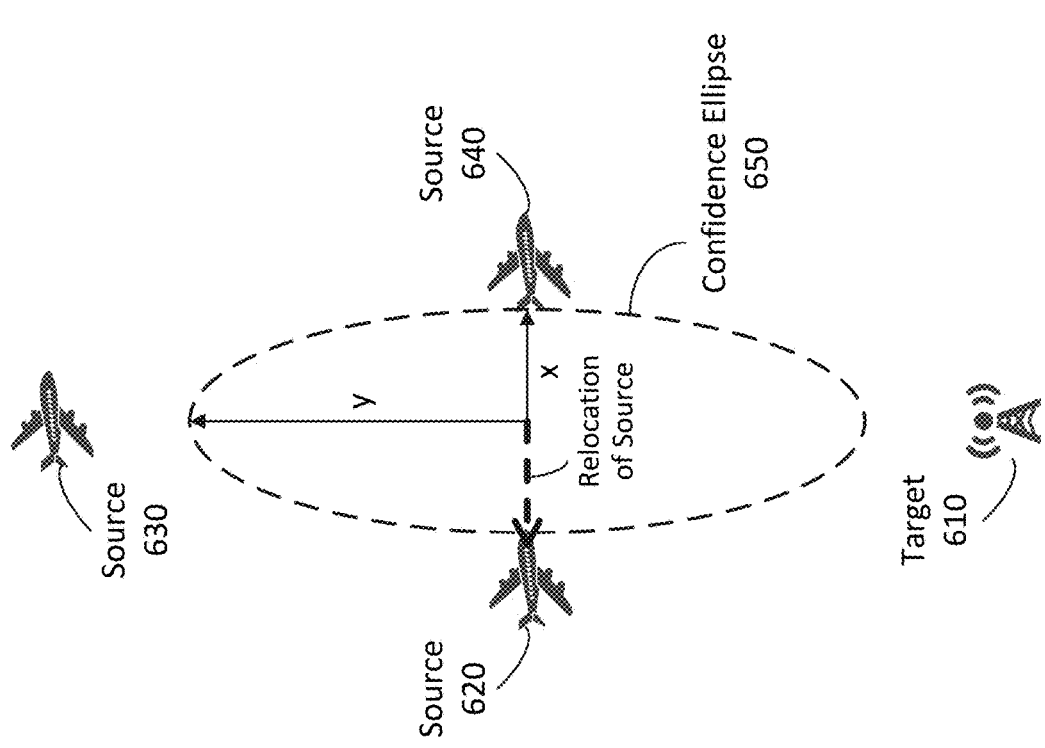
FIG. 6 is a plan view of an example satisfactory geolocation geometry as determined by a geolocation geometry evaluation method based on a covariance matrix, according to an embodiment of the present disclosure.

FIG. 6 is a plan view of an example satisfactory geolocation geometry 600 as determined by a geolocation geometry evaluation method based on a covariance matrix, according to an embodiment of the present disclosure. In the geometry 600 of FIG. 6, the geolocation for a target 610 is performed using the sensor and location data from three sources 620, 630, and 640. The configuration is similar to that of FIG. 5, only one of the sources (namely, source 620) is better positioned, having relocated along the minor axis of the corresponding confidence ellipse 650 away from the other source 640. This removes the linearity of the target 610, source 620, and source 630 (as was present in FIG. 5) and extends the semi-minor axis x of the confidence ellipse 650 (which now has a slightly rounder shape). Accordingly, the ratio x/y improves to 0.33 in FIG. 6, which is greater than 0.25, so the geolocation geometry is evaluated as satisfactory.

In some embodiments, the geolocation evaluation technique does more than evaluate the geometry as satisfactory or unsatisfactory. For example, in some such embodiments, one or more of the sources (such as source 620 in FIG. 6) are notified to reposition themselves in such a way (e.g., away from source 640) to convert an unsatisfactory geometry (e.g., FIG. 5) to a satisfactory geometry (e.g., FIG. 6). For another example, in some embodiments, an operator of the system (e.g., a higher-level authority) is notified when a geolocation geometry is evaluated as satisfactory, but is not notified when the geolocation geometry is unsatisfactory. As such, the geolocation evaluation technique can serve other purposes such as vetting geolocations as well as providing guidance for converting unsatisfactory geometries to satisfactory geometries.

Methodology

FIG. 7 is a flow diagram of an example method 700 of geolocation of a target, according to an embodiment of the present disclosure. The method 700 may be performed, for example, by the computer 150 of FIG. 1. More generally, the method 700 and other methods described herein may be implemented in hardware or combinations of hardware and software. For example, the method 700 may be implemented by the components or techniques of FIGS. 1-6. In another embodiment, the method 700 may be implemented be a custom circuit such as a multi-sensor data fuser with custom processing circuits (such as an FPGA) configured to carry out the method 700. In other embodiments, the method 700 may be performed in conjunction with a special purpose processor, such as a signal processor.

In some other embodiments, some or all of the method 700 may be implemented as a series of computer instructions, such as software, firmware, or a combination of the two, together with one or more computer processors (e.g., one or more microprocessors). The instructions, when executed on a given processor, cause portions of the method 700 to be performed. For example, in one or more embodiments, a computer program product is provided. The computer program product includes one or more non-transitory machine-readable mediums (such as a compact disc, a DVD, a solid-state drive, a hard drive, RAM, ROM, on-chip processor cache, or the like) encoded with instructions that when executed by one or more processors cause portions of the method 700 (or other method described herein) to be carried out for geolocation of a target. In addition, while the methods described herein may appear to have a certain order to their operations, other embodiments may not be so limited. Accordingly, the order of the operations can be varied between embodiments, as would be apparent in light of this disclosure.

Referring to the method 700 of FIG. 7, a processor-based system (such as computer 150) receives 710, from a plurality of sources (such as sensor sources 130), a corresponding plurality of location data of the respective sources and a corresponding plurality of angle estimates (such as location data and angle estimates 140) of the target relative to the respective sources. The method 700 further includes generating 720 a corresponding plurality of planar renditions (such as planar renditions 300) of the received angle estimates relative to the respective obtained location data.

The method 700 further includes selecting 730 a combination of two or more of the planar renditions (such as first and second angle estimates 315 and 325) whose intersection defines a polygon (such as intersection polygon 330). In response to multiple such combinations, the method 700 further includes selecting one such combination having a largest number of the planar renditions. In response to at least two of the multiple combinations having the largest number of the planar renditions, the method 700 further includes selecting one of the at least two of the multiple combinations whose polygon has the smallest area (such as smallest intersection polygon 450).

The method 700 further includes determining 740 a center (such as the centroid or center of mass) of the polygon of the selected combination, and mapping the determined center of the polygon to a corresponding location on the Earth (such as with a database of ground elevation data). The method 700 further includes using 750 the mapped Earth location as a geolocation seed input for a more precise method of geolocating the target (such as one of the techniques disclosed in previously incorporated U.S. Pat. No. 6,933,888).

FIG. 8 is a flow diagram of an example method 800 of evaluating a geolocation geometry, according to an embodiment of the present disclosure. Referring to the method 800 of FIG. 8, a processor-based system receives 810, from a plurality of sources, a corresponding plurality of sensor data of the target and a corresponding plurality of location data of the respective sources. The method 800 further includes geolocating 820 the target from the received sensor data and the received location data, and generating 830 entries of a covariance matrix of planar covariance data from the location data and the geolocation. The method 800 further includes deriving 840 (e.g., calculating) the eigenvalues of the covariance matrix from the generated entries, and comparing the derived eigenvalues to evaluate the geolocation geometry with respect to the target.

In further detail, comparing the eigenvalues includes obtaining 850 (e.g., computing) a ratio of the square roots of the eigenvalues, and comparing 860 the obtained ratio to a threshold value. For example, the threshold value can a specified (e.g., predetermined) threshold value (such as 0.25), and obtaining the ratio of the square roots can include obtaining the ratio of a smaller one of the square roots to a larger one of the square roots. As such, the method 800 further includes evaluating the geolocation geometry as unsatisfactory if the obtained ratio is less than the specified threshold value, and not alerting an operator of the system to the geolocation (e.g., suppressing the geolocation). Otherwise, the method 800 includes evaluating the geolocation geometry as satisfactory, and alerting the operator of the system to the geolocation (e.g., report the geolocation to the next higher level).

Numerous other methods and techniques will be apparent in light of the present disclosure.

FURTHER EXAMPLE EMBODIMENTS

The following examples pertain to further embodiments, from which numerous permutations and configurations will be apparent.

Example 1 is a method of geolocating a target, the method including: receiving, at a processor-based system from a plurality of sources, a corresponding plurality of angle estimates of the target relative to the respective sources; generating, by the processor-based system, a corresponding plurality of planar renditions of the received angle estimates; selecting, by the processor-based system, a combination of two or more said planar renditions whose intersection defines a polygon; in response to multiple such combinations, selecting the combination includes selecting one such combination having a largest number of the planar renditions; and determining, by the processor-based system, a center of the polygon of the selected combination.

Example 2 includes the method of Example 1, further including mapping, by the processor-based system, the determined center of the polygon to a corresponding location on the Earth.

Example 3 includes the method of Example 2, further including using, by the processor-based system, the mapped Earth location as a geolocation seed input for a more precise method of geolocating the target.

Example 4 includes the method of Example 1, further including obtaining, at the processor-based system from the sources, a corresponding plurality of location data of the respective sources, wherein generating the planar renditions includes generating the planar renditions of the angle estimates relative to the respective obtained location data.

Example 5 includes the method of Example 1, wherein in response to at least two of the multiple combinations having the largest number of the planar renditions, selecting the combination includes selecting one of the at least two of the multiple combinations whose polygon has the smallest area.

Example 6 includes the method of Example 1, wherein determining the center of the polygon includes determining the centroid of the polygon.

Example 7 includes the method of Example 1, wherein the angle estimates are generated by a corresponding plurality of processing elements at the respective sources.

Example 8 includes the method of Example 7, wherein the angle estimates are further generated based on a corresponding plurality of sets of radar emissions from the target and sensed at the respective sources.

Example 9 is a computer program product including one or more non-transitory machine-readable storage mediums having instructions encoded thereon that when executed by one or more processors, cause a process to be carried out for geolocating a target, the process including: receiving, from a plurality of sources, a corresponding plurality of angle estimates of the target relative to the respective sources; generating a corresponding plurality of planar renditions of the received angle estimates; selecting a combination of two or more said planar renditions whose intersection defines a polygon; in response to multiple such combinations, selecting the combination includes selecting one such combination having a largest number of the planar renditions; and determining a center of the polygon of the selected combination.

Example 10 includes the computer program product of Example 9, wherein the process further includes mapping the determined center of the polygon to a corresponding location on the Earth.

Example 11 includes the computer program product of Example 10, wherein the process further includes using the mapped Earth location as a geolocation seed input for a more precise process of geolocating the target.

Example 12 includes the computer program product of Example 9, wherein the process further includes obtaining, from the sources, a corresponding plurality of location data of the respective sources, and wherein generating the planar renditions includes generating the planar renditions of the angle estimates relative to the respective obtained location data.

Example 13 includes the computer program product of Example 9, wherein in response to at least two of the multiple combinations having the largest number of the planar renditions, selecting the combination includes selecting one of the at least two of the multiple combinations whose polygon has the smallest area.

Example 14 includes the computer program product of Example 9, wherein determining the center of the polygon includes determining the centroid of the polygon.

Example 15 includes the computer program product of Example 9, wherein the angle estimates are generated by a corresponding plurality of processing elements at the respective sources based on a corresponding plurality of sets of radar emissions from the target and sensed at the respective sources.

Example 16 is a system including: the computer program product of Example 9; and the one or more processors to execute the encoded instructions.

Example 17 is a method of evaluating geolocation geometry with respect to a target, the method including: receiving, at a processor-based system from a plurality of sources, a corresponding plurality of sensor data of the target and a corresponding plurality of location data of the respective sources; geolocating, at the processor-based system, the target from the received sensor data and the received location data; generating, at the processor-based system, entries of a covariance matrix from the location data and the geolocation; deriving, at the processor-based system, eigenvalues of the covariance matrix from the generated entries; and comparing, at the processor-based system, the derived eigenvalues to evaluate the geolocation geometry with respect to the target.

Example 18 includes the method of Example 17, wherein comparing the derived eigenvalues includes obtaining a ratio of the square roots of the derived eigenvalues, and comparing the obtained ratio to a threshold value.

Example 19 includes the method of Example 18, wherein the threshold value is a specified threshold value, and obtaining the ratio of the square roots includes obtaining the ratio of a smaller one of the square roots to a larger one of the square roots, the geolocation geometry being evaluated as unsatisfactory if the obtained ratio is less than the specified threshold value.

Example 20 includes the method of Example 17, wherein in response to the evaluated geolocation geometry being unsatisfactory, the method further includes notifying, by the processor-based system, one or more of the sources to relocate with respect to the geolocation and the location data of others of the sources.

Example 21 includes the method of Example 17, wherein in response to the evaluated geolocation geometry being satisfactory, the method further includes alerting, by the processor-based system, an operator of the system to the geolocation.

Example 22 includes the method of Example 21, wherein in response to the evaluated geolocation geometry being unsatisfactory, the method further includes not alerting, by the processor-based system, the operator of the system to the geolocation.

Example 23 includes the method of Example 17, wherein the sensor data is generated by a corresponding plurality of radar sensors at the respective sources based on a corresponding plurality of sets of radar emissions from the target.

Example 24 is a computer program product including one or more non-transitory machine-readable storage mediums having instructions encoded thereon that when executed by one or more processors, cause a process to be carried out for evaluating geolocation geometry with respect to a target, the process including: receiving, from a plurality of sources, a corresponding plurality of sensor data of the target and a corresponding plurality of location data of the respective sources; geolocating the target from the received sensor data and the received location data; generating entries of a covariance matrix from the location data and the geolocation; deriving eigenvalues of the covariance matrix from the generated entries; and comparing the derived eigenvalues to evaluate the geolocation geometry with respect to the target.

Example 25 includes the computer program product of Example 24, wherein comparing the derived eigenvalues includes obtaining a ratio of the square roots of the derived eigenvalues, and comparing the obtained ratio to a threshold value.

Example 26 includes the computer program product of Example 25, wherein the threshold value is a specified threshold value, and obtaining the ratio of the square roots includes obtaining the ratio of a smaller one of the square roots to a larger one of the square roots, the geolocation geometry being evaluated as unsatisfactory if the obtained ratio is less than the specified threshold value.

Example 27 includes the computer program product of Example 24, wherein in response to the evaluated geolocation geometry being unsatisfactory, the process further includes notifying one or more of the sources to relocate with respect to the geolocation and the location data of others of the sources.

Example 28 includes the computer program product of Example 24, wherein the process further includes: alerting an operator of the one or more processors to the geolocation in response to the evaluated geolocation geometry being satisfactory; and not alerting the operator of the one or more processor to the geolocation in response to the evaluated geolocation geometry being unsatisfactory.

Example 29 includes the computer program product of Example 24, wherein the sensor data is generated by a corresponding plurality of radar sensors at the respective sources based on a corresponding plurality of sets of radar emissions from the target.

Example 30 is a system including: the computer program product of Example 24; and the one or more processors to execute the encoded instructions The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. In addition, various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A method of geolocating a target, the method comprising:
receiving, at a processor-based system from a plurality of sources, a corresponding plurality of angle estimates of the target relative to the respective sources;
generating, by the processor-based system, a corresponding plurality of planar renditions of the received angle estimates;
selecting, by the processor-based system, a combination of two or more of the planar renditions whose intersection defines a polygon;
in response to multiple such combinations, selecting the combination comprises selecting one such combination having a largest number of the planar renditions; and
determining, by the processor-based system, a center of the polygon of the selected combination.

2. The method of claim 1, further comprising mapping, by the processor-based system, the determined center of the polygon to a corresponding location on Earth.

3. The method of claim 2, further comprising using, by the processor-based system, the mapped Earth location as a geolocation seed input for a more precise method of geolocating the target.

4. The method of claim 1, further comprising obtaining, at the processor-based system from the sources, a corresponding plurality of location data of the respective sources, wherein generating the planar renditions comprises generating the planar renditions of the angle estimates relative to the respective obtained location data.

5. The method of claim 1, wherein in response to at least two of the multiple combinations having the largest number of the planar renditions, selecting the combination comprises selecting one of the at least two of the multiple combinations whose polygon has a smallest area.

6. The method of claim 1, wherein determining the center of the polygon comprises determining a centroid of the polygon.

7. The method of claim 1, wherein the angle estimates are generated by a corresponding plurality of processing elements at the respective sources.

8. The method of claim 7, wherein the angle estimates are further generated based on a corresponding plurality of sets of radar emissions from the target and sensed at the respective sources.

9. A computer program product including one or more non-transitory machine-readable storage mediums having instructions encoded thereon that when executed by one or more processors, cause a process to be carried out for geolocating a target, the process comprising:
receiving, from a plurality of sources, a corresponding plurality of angle estimates of the target relative to the respective sources;
generating a corresponding plurality of planar renditions of the received angle estimates;
selecting a combination of two or more of the planar renditions whose intersection defines a polygon;
in response to multiple such combinations, selecting the combination comprises selecting one such combination having a largest number of the planar renditions; and
determining a center of the polygon of the selected combination.

10. The computer program product of claim 9, wherein the process further comprises mapping the determined center of the polygon to a corresponding location on Earth.

11. The computer program product of claim 10, wherein the process further comprises using the mapped Earth location as a geolocation seed input for a more precise process of geolocating the target.

12. The computer program product of claim 9, wherein the process further comprises obtaining, from the sources, a corresponding plurality of location data of the respective sources, and wherein generating the planar renditions comprises generating the planar renditions of the angle estimates relative to the respective obtained location data.

13. The computer program product of claim 9, wherein in response to at least two of the multiple combinations having the largest number of the planar renditions, selecting the combination comprises selecting one of the at least two of the multiple combinations whose polygon has a smallest area.

14. The computer program product of claim 9, wherein determining the center of the polygon comprises determining a centroid of the polygon.

15. The computer program product of claim 9, wherein the angle estimates are generated by a corresponding plurality of processing elements at the respective sources based on a corresponding plurality of sets of radar emissions from the target and sensed at the respective sources.

16. A system comprising:
   the computer program product of claim 9; and
   the one or more processors to execute the encoded instructions.

\* \* \* \* \*